(12) United States Patent
Ma

(10) Patent No.: US 12,207,714 B2
(45) Date of Patent: Jan. 28, 2025

(54) UMBRELLA POLE

(71) Applicant: Zhun-An Ma, Ningbo (CN)

(72) Inventor: Zhun-An Ma, Ningbo (CN)

( * ) Notice: Subject to any disclaimer, the term of this patent is extended or adjusted under 35 U.S.C. 154(b) by 182 days.

(21) Appl. No.: 17/815,869

(22) Filed: Jul. 28, 2022

(65) Prior Publication Data
US 2023/0047818 A1   Feb. 16, 2023

Related U.S. Application Data

(60) Provisional application No. 63/260,180, filed on Aug. 11, 2021.

(51) Int. Cl.
| | | |
|---|---|---|
| *A45B 9/00* | (2006.01) | |
| *A45B 23/00* | (2006.01) | |
| *A45B 25/00* | (2006.01) | |
| *F16B 7/10* | (2006.01) | |
| *F16B 7/04* | (2006.01) | |

(52) U.S. Cl.
CPC ............ *A45B 25/00* (2013.01); *A45B 9/00* (2013.01); *F16B 7/105* (2013.01); *A45B 2009/005* (2013.01); *A45B 2025/003* (2013.01); *F16B 7/042* (2013.01); *F16B 2200/99* (2023.08); *Y10T 403/32483* (2015.01); *Y10T 403/32508* (2015.01); *Y10T 403/32524* (2015.01); *Y10T 403/591* (2015.01); *Y10T 403/592* (2015.01);
(Continued)

(58) Field of Classification Search
CPC ..... A45B 25/00; A45B 9/00; A45B 2009/005; A45B 2025/003; A45B 2023/0012; A45B 19/04; F16B 7/105; F16B 7/042; F16B 2200/99; Y10T 403/32483; Y10T 403/32508; Y10T 403/32524; Y10T 403/591; Y10T 403/592; Y10T 403/7007; Y10T 403/7016; Y10T 403/7026
See application file for complete search history.

(56) References Cited

U.S. PATENT DOCUMENTS

| | | | |
|---|---|---|---|
| 593,729 A | * | 11/1897 | Skinner .................. F16B 7/105 |
| | | | 279/93 |
| 835,306 A | | 11/1906 | Mangelsdorf |
| (Continued) | | | |

FOREIGN PATENT DOCUMENTS

| | | |
|---|---|---|
| AT | 128258 | 5/1932 |
| BG | 6965-0001 | 4/2009 |

(Continued)

OTHER PUBLICATIONS

Operation Manual Easy Sun Parasol Sunshade (Issue: Jul. 2004) pp. 1-17.

(Continued)

*Primary Examiner* — Robert Canfield
(74) *Attorney, Agent, or Firm* — Knobbe, Martens, Olson & Bear, LLP

(57) ABSTRACT

A multi-piece umbrella pole that includes first and second pole sections that are assembled into an elongate umbrella pole. The pole sections include an alignment notch and cross pin for facilitating assembly of the two pole sections. An outer sleeve includes a button assembly that can actuate a detent pin for coupling or decoupling the pole sections. The outer sleeve can also include an actuator for a tilt mechanism that angles a canopy portion of the umbrella assembly.

20 Claims, 4 Drawing Sheets

(52) U.S. Cl.
CPC .... *Y10T 403/7007* (2015.01); *Y10T 403/7016* (2015.01); *Y10T 403/7026* (2015.01)

(56) References Cited

U.S. PATENT DOCUMENTS

| | | | |
|---|---|---|---|
| 878,270 A | 2/1908 | Blake et al. | |
| 956,657 A | 5/1910 | Wetteroth | |
| 957,528 A | 5/1910 | Wetteroth | |
| D45,227 S | 2/1914 | Glauber | |
| 1,136,887 A | 4/1915 | Penn | |
| 1,235,296 A | 7/1917 | Dillingham | |
| 1,243,594 A | 10/1917 | Dillingham | |
| 1,255,627 A | 2/1918 | Morrow et al. | |
| 1,268,354 A | 6/1918 | Howard | |
| 1,801,913 A | 4/1931 | Frederick | |
| 1,881,990 A | 10/1932 | Zitzer | |
| D90,772 S | 9/1933 | Kasch | |
| 1,972,653 A | 9/1934 | Hart | |
| 2,013,192 A | 9/1935 | Sidney | |
| 2,223,253 A | 11/1940 | Hamilton | |
| D127,735 S | 6/1941 | Dreyfuss | |
| 2,447,972 A | 8/1948 | Weinert | |
| 2,462,560 A | 2/1949 | Schmidt | |
| 2,475,406 A | 7/1949 | Russell | |
| D162,678 S | 3/1951 | Muller-Munk | |
| D167,619 S | 9/1952 | Coran | |
| 2,661,012 A | 12/1953 | Militano | |
| 2,719,688 A * | 10/1955 | Seifert | A47F 7/06 |
| | | | 403/328 |
| 2,721,569 A | 10/1955 | Militano | |
| 2,745,421 A | 5/1956 | Russell | |
| 2,762,383 A | 9/1956 | Wittman | |
| 2,819,725 A | 1/1958 | Deisenroth et al. | |
| D183,609 S | 9/1958 | Higgins | |
| 2,932,047 A | 4/1960 | Johnston | |
| 2,937,653 A | 5/1960 | Danciart et al. | |
| D190,597 S | 6/1961 | Nelson | |
| 3,120,238 A | 2/1964 | Glatz | |
| 3,129,715 A | 4/1964 | Militano | |
| 3,142,307 A | 7/1964 | Danciart et al. | |
| 3,145,720 A | 8/1964 | Torii | |
| 3,171,418 A | 3/1965 | Meyer | |
| 3,175,568 A | 3/1965 | Kafka | |
| 3,177,882 A | 4/1965 | Militano | |
| 3,177,883 A | 4/1965 | Militano | |
| 3,253,310 A * | 5/1966 | McCarthy | F16B 7/22 |
| | | | 24/607 |
| 3,279,835 A | 10/1966 | Krohm | |
| 3,311,119 A | 3/1967 | Pearlstine | |
| 3,347,575 A * | 10/1967 | Morris | F16B 7/105 |
| | | | 403/107 |
| 3,395,717 A | 8/1968 | Weber | |
| 3,424,180 A | 1/1969 | Giancarlo | |
| 3,457,931 A | 7/1969 | Yoshio | |
| 3,521,651 A | 7/1970 | Pearlstine | |
| D221,039 S | 6/1971 | Zimmerman | |
| 3,683,948 A | 8/1972 | Cohen | |
| 3,802,452 A | 4/1974 | Weber | |
| 3,856,032 A | 12/1974 | Schafer | |
| D234,729 S | 4/1975 | Weber et al. | |
| D265,498 S | 7/1982 | Paul | |
| 4,368,749 A | 1/1983 | Lindler et al. | |
| 4,385,849 A * | 5/1983 | Crain | F16B 7/105 |
| | | | 343/901 |
| D276,838 S | 12/1984 | Hill et al. | |
| 4,586,525 A | 5/1986 | Glatz et al. | |
| 4,622,987 A | 11/1986 | Redl et al. | |
| 4,674,523 A | 6/1987 | Glatz | |
| 4,807,655 A | 2/1989 | Robertson | |
| 4,811,670 A | 3/1989 | Kolvites et al. | |
| 4,829,857 A * | 5/1989 | Jones | B25G 3/18 |
| | | | 81/177.1 |
| 4,878,509 A | 11/1989 | Tung | |
| 4,911,573 A * | 3/1990 | Pietro | F16B 7/20 |
| | | | 285/361 |
| 4,993,445 A | 2/1991 | Dubinsky | |
| 5,002,081 A | 3/1991 | Stromeyer | |
| 5,020,557 A | 6/1991 | Apple | |
| 5,029,596 A | 7/1991 | Tung | |
| 5,050,627 A | 9/1991 | Hengtzu | |
| 5,174,319 A | 12/1992 | Chou et al. | |
| 5,186,197 A * | 2/1993 | Lavine | A45B 19/00 |
| | | | 135/25.4 |
| 5,284,171 A | 2/1994 | Liu | |
| D344,786 S | 3/1994 | Short et al. | |
| 5,333,824 A * | 8/1994 | Dubinsky | F16B 7/182 |
| | | | 411/177 |
| 5,349,975 A | 9/1994 | Valdner | |
| 5,355,903 A | 10/1994 | Haddad et al. | |
| 5,357,994 A | 10/1994 | Chung | |
| D366,826 S | 2/1996 | Heithaus | |
| 5,499,644 A | 3/1996 | Geniele | |
| D372,854 S | 8/1996 | Jimenez | |
| 5,584,564 A | 12/1996 | Phyle | |
| 5,588,455 A | 12/1996 | Kuo | |
| 5,611,364 A | 3/1997 | Woods et al. | |
| 5,615,698 A | 4/1997 | Ko | |
| 5,617,888 A | 4/1997 | Wu | |
| 5,640,984 A | 6/1997 | Dubunsky | |
| 5,651,732 A * | 7/1997 | Dufour | F23J 13/04 |
| | | | 126/307 R |
| 5,655,557 A | 8/1997 | Martin | |
| 5,740,823 A | 4/1998 | Lin et al. | |
| 5,740,824 A | 4/1998 | Tang | |
| 5,749,386 A | 5/1998 | Samuel, Jr. | |
| 5,779,386 A * | 7/1998 | Eichhorn | F16B 7/0413 |
| | | | 403/328 |
| 5,785,069 A | 7/1998 | Glatz | |
| D397,054 S | 8/1998 | Brantley et al. | |
| D398,443 S | 9/1998 | Bolle | |
| 5,809,734 A | 9/1998 | Turner | |
| 5,816,276 A | 10/1998 | Seidel et al. | |
| D400,777 S | 11/1998 | Carsello | |
| 5,836,328 A | 11/1998 | Lee | |
| 5,868,152 A | 2/1999 | Brown | |
| 5,871,024 A | 2/1999 | Vanderminden, Sr. | |
| 5,884,645 A | 3/1999 | Chen et al. | |
| D408,621 S | 4/1999 | Kuo | |
| 5,899,210 A | 5/1999 | Letherby et al. | |
| D410,862 S | 6/1999 | Milhov | |
| 5,921,115 A | 7/1999 | Winner | |
| 5,937,882 A | 8/1999 | Harbaugh | |
| 6,014,980 A | 1/2000 | Glatz | |
| D424,799 S | 5/2000 | Lai | |
| 6,082,383 A | 7/2000 | Wilson | |
| 6,129,101 A | 10/2000 | Dubinsky | |
| D434,215 S | 11/2000 | Lin | |
| D434,476 S | 11/2000 | Meda | |
| 6,145,523 A | 11/2000 | Lo | |
| 6,152,156 A | 11/2000 | Tung | |
| D434,556 S | 12/2000 | Lin | |
| 6,192,907 B1 | 2/2001 | Wu | |
| 6,216,712 B1 | 4/2001 | Lin et al. | |
| 6,220,261 B1 | 4/2001 | Glatz | |
| 6,230,728 B1 | 5/2001 | Reese | |
| 6,247,483 B1 | 6/2001 | Rung | |
| 6,305,394 B1 | 10/2001 | Reese | |
| 6,311,705 B1 | 11/2001 | Ma | |
| 6,311,707 B1 | 11/2001 | Wu et al. | |
| 6,314,976 B1 | 11/2001 | Clarke | |
| 6,330,886 B1 | 12/2001 | Culver | |
| 6,345,639 B2 | 2/2002 | Rousselle et al. | |
| 6,371,141 B1 | 4/2002 | Lin et al. | |
| 6,371,686 B1 * | 4/2002 | Wu | F16B 7/105 |
| | | | 135/25.1 |
| 6,374,840 B1 | 4/2002 | Ma | |
| 6,386,214 B1 | 5/2002 | Clarke | |
| 6,386,215 B1 | 5/2002 | Chang | |
| D458,904 S | 6/2002 | Montena | |
| 6,412,506 B1 | 7/2002 | Reese | |
| 6,422,251 B1 | 7/2002 | Tseng | |
| 6,446,650 B1 | 9/2002 | Ma | |
| 6,478,037 B2 | 11/2002 | Tung | |
| 6,516,820 B1 | 2/2003 | Earnshaw | |

(56) References Cited

U.S. PATENT DOCUMENTS

| | | | |
|---|---|---|---|
| 6,571,813 | B2 | 6/2003 | Lin et al. |
| 6,575,182 | B2 | 6/2003 | Tung |
| 6,575,183 | B2 | 6/2003 | Tung |
| D477,458 | S | 7/2003 | Goldwitz |
| 6,588,438 | B1 | 7/2003 | Steiner |
| 6,595,713 | B1 * | 7/2003 | Wilson .................... F16B 7/042 |
| | | | 403/328 |
| D478,416 | S | 8/2003 | Clarke |
| 6,619,306 | B2 | 9/2003 | Ma |
| 6,662,815 | B2 | 12/2003 | Tung |
| D484,680 | S | 1/2004 | You |
| D489,169 | S | 5/2004 | You |
| D489,170 | S | 5/2004 | You |
| D489,967 | S | 5/2004 | Funk |
| 6,732,753 | B2 | 5/2004 | Chang |
| 6,758,229 | B2 | 7/2004 | Wang |
| D497,478 | S | 10/2004 | Clarke |
| D497,479 | S | 10/2004 | Yu |
| 6,810,895 | B2 | 11/2004 | Lin et al. |
| 6,837,255 | B2 | 1/2005 | Bunch et al. |
| 6,848,459 | B2 | 2/2005 | Ma |
| 6,851,823 | B2 | 2/2005 | Bilotti |
| D503,035 | S | 3/2005 | Ko |
| 6,889,699 | B2 | 5/2005 | Clarke |
| 6,920,887 | B2 | 7/2005 | Lo |
| 6,941,960 | B2 | 9/2005 | Huang |
| D515,803 | S | 2/2006 | You |
| 7,000,624 | B2 | 2/2006 | Chang |
| D525,721 | S | 7/2006 | Landes |
| 7,082,953 | B2 | 8/2006 | Liu |
| 7,089,950 | B2 | 8/2006 | Lin |
| D532,947 | S | 11/2006 | Muscarella |
| 7,182,713 | B2 * | 2/2007 | Wang ................. G06F 3/03543 |
| | | | 482/28 |
| D539,632 | S | 4/2007 | Ma |
| 7,255,118 | B2 | 8/2007 | Ma |
| 7,281,542 | B2 | 10/2007 | Ko |
| D555,349 | S | 11/2007 | You |
| 7,293,573 | B2 | 11/2007 | Clarke |
| D558,444 | S | 1/2008 | Ma |
| 7,318,444 | B2 | 1/2008 | Clakre |
| 7,328,715 | B2 | 2/2008 | Neubardt |
| 7,412,985 | B2 | 8/2008 | Ma |
| D586,549 | S | 2/2009 | Hermanson et al. |
| D586,550 | S | 2/2009 | Hermanson et al. |
| D587,448 | S | 3/2009 | You |
| 7,546,845 | B2 | 6/2009 | Prusmack |
| D600,439 | S | 9/2009 | Zonsius |
| 7,600,734 | B2 | 10/2009 | Clarke |
| 7,665,477 | B1 | 2/2010 | Hathaway |
| 7,686,024 | B1 | 3/2010 | Lai |
| 7,703,464 | B2 | 4/2010 | Ma |
| 7,775,226 | B2 | 8/2010 | MacDonald et al. |
| 7,806,130 | B2 | 10/2010 | Gobel |
| D631,243 | S | 1/2011 | Forthuber et al. |
| 7,861,734 | B2 | 1/2011 | Ma |
| 7,891,367 | B2 | 2/2011 | Ma |
| 7,900,643 | B2 | 3/2011 | Ma |
| 7,913,708 | B2 | 3/2011 | Yung |
| 7,913,709 | B2 | 3/2011 | Brebner |
| D637,388 | S | 5/2011 | You |
| D640,464 | S | 6/2011 | Forthuber et al. |
| 7,980,262 | B1 | 7/2011 | You |
| 8,020,572 | B2 | 9/2011 | Ma |
| 8,053,042 | B1 * | 11/2011 | Loomis ................. A47G 33/06 |
| | | | 428/20 |
| 8,061,375 | B2 | 11/2011 | Ma |
| D650,984 | S | 12/2011 | Pineda |
| 8,082,935 | B2 | 12/2011 | Ma |
| 8,096,310 | B2 | 1/2012 | Clarke |
| 8,100,139 | B2 | 1/2012 | Chong |
| D664,760 | S | 8/2012 | Elder |
| 8,272,391 | B2 | 9/2012 | Luo |
| 8,298,633 | B1 * | 10/2012 | Chen ....................... A41G 1/007 |
| | | | 428/20 |
| 8,402,981 | B2 | 3/2013 | Liu |
| 8,443,819 | B2 | 5/2013 | Beaulieu |
| 8,522,804 | B1 | 9/2013 | Tung |
| D704,044 | S | 5/2014 | Makino |
| 8,763,620 | B1 | 7/2014 | Tung |
| D714,132 | S | 9/2014 | Hazantonis |
| 8,899,250 | B1 | 12/2014 | Tung |
| D727,469 | S | 4/2015 | Jorgensen |
| 9,004,087 | B2 | 4/2015 | Ma |
| D731,166 | S | 6/2015 | Ma |
| 9,113,683 | B2 | 8/2015 | Ma |
| D753,271 | S | 4/2016 | LaBarbera et al. |
| D759,955 | S | 6/2016 | Ma |
| D759,956 | S | 6/2016 | McQuaid |
| 9,504,298 | B2 | 11/2016 | Li |
| 9,615,637 | B1 | 4/2017 | Tung |
| 9,844,288 | B2 * | 12/2017 | Fu ........................... A47G 33/06 |
| D818,697 | S | 5/2018 | Ma |
| 10,016,033 | B2 | 7/2018 | Volin |
| 10,562,172 | B1 | 2/2020 | Armstrong |
| 10,736,390 | B2 | 8/2020 | Ma |
| 10,758,015 | B2 | 9/2020 | Ma |
| 10,945,381 | B1 * | 3/2021 | Pringnitz .................. B25G 1/04 |
| 11,123,857 | B1 * | 9/2021 | Ramsey .................... B25G 1/04 |
| 11,206,903 | B2 | 12/2021 | Ma |
| 11,388,963 | B2 | 7/2022 | Ma |
| 11,771,186 | B2 | 10/2023 | Ma |
| 11,779,089 | B2 | 10/2023 | Ma |
| D1,003,592 | S * | 11/2023 | Ma ................................ D8/382 |
| 2001/0017150 | A1 * | 8/2001 | Doreste ................. A45B 23/00 |
| | | | 52/165 |
| 2002/0083969 | A1 | 7/2002 | Tung |
| 2002/0139405 | A1 | 10/2002 | Lee |
| 2003/0010367 | A1 | 1/2003 | Ko |
| 2003/0015230 | A1 | 1/2003 | Glatz |
| 2003/0062073 | A1 | 4/2003 | Tung |
| 2004/0031513 | A1 | 2/2004 | Bunch et al. |
| 2004/0055627 | A1 | 3/2004 | P. Moga |
| 2004/0055628 | A1 | 3/2004 | Yu |
| 2004/0069333 | A1 | 4/2004 | Ma |
| 2004/0154525 | A1 | 8/2004 | Wirth et al. |
| 2004/0182429 | A1 | 9/2004 | Chen |
| 2004/0187900 | A1 | 9/2004 | Earnshaw |
| 2004/0206382 | A1 | 10/2004 | Clarke |
| 2004/0206383 | A1 | 10/2004 | Clarke |
| 2005/0081902 | A1 | 4/2005 | Liu |
| 2005/0098200 | A1 | 5/2005 | Su |
| 2005/0238422 | A1 * | 10/2005 | Hung ....................... F16B 7/042 |
| | | | 403/379.4 |
| 2005/0279520 | A1 | 12/2005 | Newman et al. |
| 2006/0005867 | A1 | 1/2006 | Chang |
| 2006/0046899 | A1 * | 3/2006 | Wang .................. A63B 71/023 |
| | | | 482/27 |
| 2006/0151018 | A1 | 7/2006 | Wilson |
| 2006/0151019 | A1 | 7/2006 | Lo |
| 2007/0113878 | A1 | 5/2007 | Ko |
| 2007/0261728 | A1 | 11/2007 | Lin |
| 2008/0041433 | A1 | 2/2008 | Caldwell |
| 2008/0053498 | A1 | 3/2008 | Liu et al. |
| 2008/0202570 | A1 | 8/2008 | Clarke |
| 2009/0126769 | A1 | 5/2009 | Hoogendoorn |
| 2009/0242065 | A1 | 10/2009 | Whitling et al. |
| 2010/0139724 | A1 | 6/2010 | Lai |
| 2010/0139725 | A1 | 6/2010 | Lai |
| 2011/0061694 | A1 | 3/2011 | Vanderminden, Sr. |
| 2011/0132418 | A1 | 6/2011 | Ma |
| 2011/0209732 | A1 | 9/2011 | Ma |
| 2011/0214705 | A1 | 9/2011 | Ma |
| 2011/0241389 | A1 * | 10/2011 | Tsai ........................... B62J 1/08 |
| | | | 297/195.1 |
| 2011/0277800 | A1 | 11/2011 | Tung |
| 2012/0126533 | A1 * | 5/2012 | Canale .................... A47L 9/244 |
| | | | 285/145.1 |
| 2012/0155958 | A1 | 6/2012 | Donohue |
| 2014/0109942 | A1 | 4/2014 | Ma |
| 2014/0305476 | A1 | 10/2014 | Ma |
| 2014/0376990 | A1 * | 12/2014 | Lai .......................... F16B 7/042 |
| | | | 403/109.3 |
| 2015/0237976 | A1 | 8/2015 | Chow |

(56) References Cited

U.S. PATENT DOCUMENTS

| | | |
|---|---|---|
| 2019/0082802 A1 | 3/2019 | Ma |
| 2019/0323531 A1* | 10/2019 | Wang ................ F16B 7/042 |
| 2020/0297085 A1 | 9/2020 | Ma |
| 2020/0384328 A1 | 12/2020 | Chua |
| 2021/0112932 A1 | 4/2021 | Ma |
| 2021/0298435 A1 | 9/2021 | Ma |
| 2022/0125169 A1 | 4/2022 | Ma |
| 2022/0265013 A1 | 8/2022 | Ma |
| 2022/0400822 A1 | 12/2022 | Ma |
| 2023/0018195 A1 | 1/2023 | Ma |
| 2023/0270216 A1 | 8/2023 | Ma |

FOREIGN PATENT DOCUMENTS

| | | |
|---|---|---|
| CN | 2054635 | 3/1990 |
| CN | 2472559 | 1/2002 |
| CN | 2494144 | 6/2002 |
| CN | 2512299 | 9/2002 |
| CN | 2579212 | 10/2003 |
| CN | 2629510 | 8/2004 |
| CN | 202060155 | 12/2011 |
| CN | 202190859 | 4/2012 |
| CN | 202588579 | 12/2012 |
| CN | 202636818 | 1/2013 |
| CN | 203168230 | 9/2013 |
| CN | 204181115 | 3/2015 |
| CN | 106889721 | 4/2017 |
| CN | 208280719 | 12/2018 |
| CN | 210581325 | 5/2020 |
| CN | 211229881 | 8/2020 |
| DE | 22 04 217 | 8/1973 |
| DE | 24 34 495 | 2/1975 |
| DE | 3820573 | 8/1989 |
| DE | 29516009 | 11/1995 |
| DE | 202010011240 | 11/2010 |
| DE | 20 2010 013 970 | 4/2011 |
| DE | 202012007364 | 11/2012 |
| DE | 202017002887 | 7/2017 |
| DE | 202019103816 | 7/2019 |
| EP | 0 628 264 | 12/1994 |
| EP | 1 302 120 | 3/2005 |
| EP | 1 510 145 | 3/2005 |
| EP | 2 289 364 | 3/2011 |
| EP | 007772157-0001 | 3/2020 |
| EP | 3 888 484 | 10/2021 |
| EP | 4 118 998 | 1/2023 |
| FR | 2612551 | 9/1988 |
| FR | 2672781 A3 | 8/1992 |
| JP | 58-107024 | 7/1983 |
| JP | S61-37814 | 3/1986 |
| JP | H08-322621 | 12/1996 |
| JP | 2000-139533 | 5/2000 |
| JP | 2001-046131 | 2/2001 |
| JP | 2006-110317 A | 4/2006 |
| JP | 2007-222591 | 9/2007 |
| JP | 2008-142310 | 6/2008 |
| JP | 3144314 | 7/2008 |
| JP | 2009-045359 | 3/2009 |
| JP | 2009-247750 | 10/2009 |
| WO | WO 2005/058089 | 6/2005 |
| WO | WO 2006/000136 | 1/2006 |
| WO | WO 2007/092514 | 8/2007 |
| WO | WO 2013/013474 | 1/2013 |
| WO | WO 2018/084181 | 5/2018 |

OTHER PUBLICATIONS

Amazon.com, Site visited Feb. 7, 2023, ITT AHO Heavy Duty Telescoping Extension Pole, First available Dec. 21, 2019, https://US.amazon .com/ITTAHO-Aluminum-Telescopic-Extension-Telescoping/dp/B07ZT8M9VD (Year: 2019).

Shadeaustralia.com.au, Site visited Jan. 23, 2023, Shelta Como Umbrella, oldest review dated Dec. 7, 2017, https://www.shadeaustralia.com.au/como-timber-umbrella (Year: 2017).

Youtube.com, Site visited Jan. 24, 2023, "Cool Pool Products Umbrella Sleeve," published on Jul. 19, 2019 by CoolPoolProducts: https://www .youtube.com/watch?v=x_qAK8QDJ Ko&list=TLGGy0td2PTduXUyNDAxMjAyMw (Year: 2019).

Youtube.com, Site visited Feb. 10, 2023, "Testrite Telescopic Tubing and Locks," published by Testrite on Sep. 26, 2017 features the FA Spring Button A-Clutch Lock: https://www.youtube.com/watch?v=Lp2uGtOGZRA (Year: 2017).

Activa 2017 Product Catalog in 92 pages.

Operation Manual Easy Sun Parasol Sunshade (Issue: 07.2004) pp. 1-17.

* cited by examiner

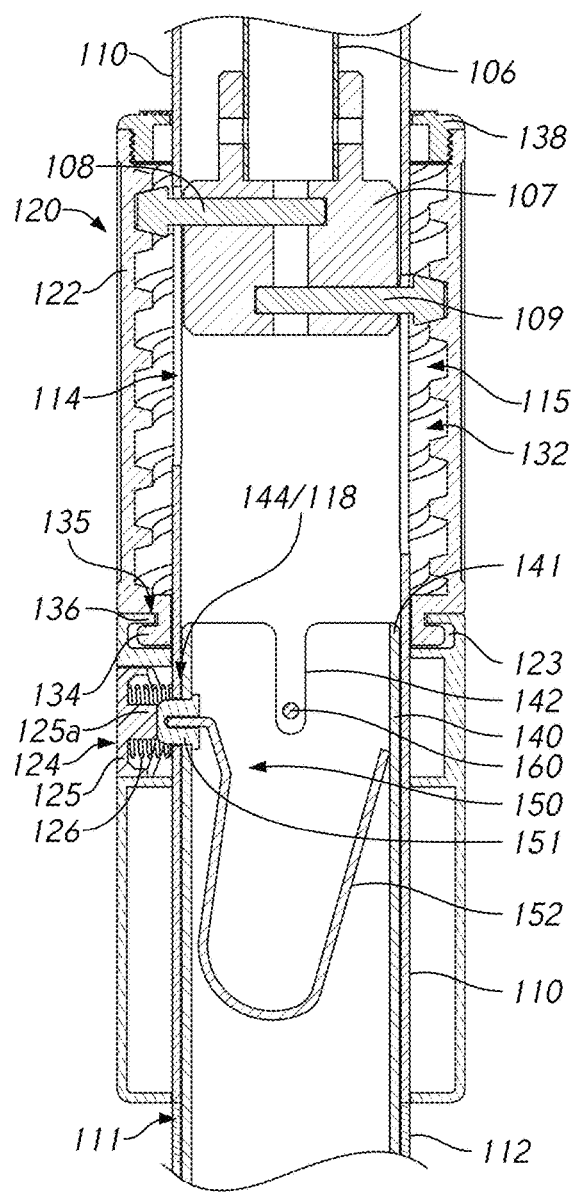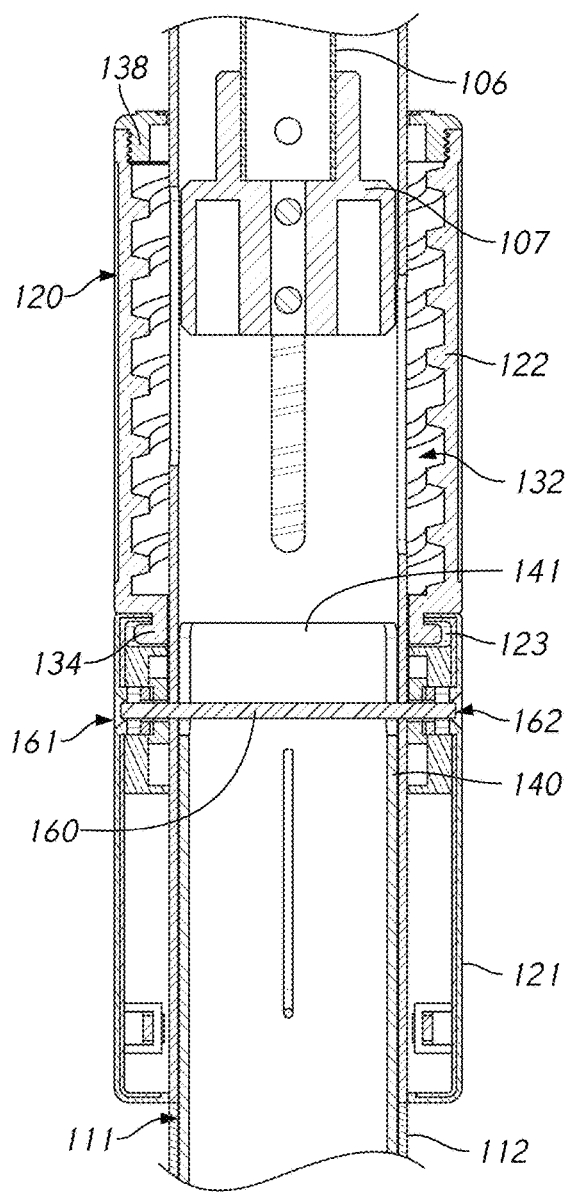
FIG. 3A
FIG. 3B

UMBRELLA POLE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND

Field

This disclosure generally relates to multiple-piece umbrella pole assemblies.

Related Art

Umbrella canopies and other large shade structures are often shipped in several disassembled pieces within a shipping box that is short/smaller than the assembled product. The upright or elongated pole, particularly, is often shipped in multiple pieces that are then assembled by a user.

SUMMARY

One aspect of the present disclosure is a multiple-piece umbrella pole that includes a first pole section with improved rotational alignment features, such as an alignment notch for aligning with a cross pin recessed within a second pole section. The engagement of the alignment notch with the cross pin can rotationally orient the first and second pole sections relative to each other to facilitate assembly thereof. In on example, the engagement of the alignment notch with the cross pin can align a detent pin with one or more detent apertures for retaining the first and second pole sections in an assembled configuration. The first pole section is a lower pole section in some embodiments. The second pole section is a section disposed above the lower pole section in some embodiments. The detent pin can be disposed in the first pole section. The detent aperture can be disposed in an assembly including the second pole section. The detent aperture can be disposed in or over or coupled with a sleeve disposed over a lower end of the second pole section.

Another aspect of the present disclosure is a multiple-piece umbrella pole assembly for supporting a canopy. The pole includes a lower pole portion including a first outer wall, a first interior space within the first outer wall, an upper end, and a lower end. An upper pole portion includes a second outer wall, a second interior space within the second outer wall. A lower end includes a lower rim, a first cross pin hole, a second cross pin hole disposed opposite the first cross pin hole, a first elongate slot, a second elongate slot disposed opposite the first elongate slot, and a first detent aperture spaced from the lower rim.

An interconnecting pole portion includes a lower connecting portion received within the upper end of the lower pole portion. An upper connecting portion extends from the upper end of the lower pole portion and is received within the lower end of the upper pole portion. The upper connecting portion includes an upper rim and an alignment notch in the upper rim. The upper connecting portion includes a first alignment notch and a second alignment notch in the upper rim in one embodiment. The first alignment notch is disposed opposite the second alignment notch. A second detent aperture spaced from the upper rim.

An outer sleeve is disposed over the lower end of the upper pole portion. The outer sleeve includes a longitudinal axis. A first portion has a third outer wall, a third interior space within the third outer wall, a third cross pin hole, a fourth cross pin hole disposed opposite the third cross pin hole, a button aperture aligned with the first detent aperture of the upper pole portion, and an upper circular slot. A second portion has a fourth outer wall, an outer grip portion on the fourth outer wall, a fourth interior space within the fourth outer wall, at least one inner channel within the fourth outer wall, and a lower circular flange. The lower circular flange is disposed within the upper circular slot such that the second portion of the outer sleeve is rotatable about the longitudinal axis relative to the first portion of the outer sleeve. A cap ring is disposed about the upper pole portion and coupled with the second portion to enclose an upper end thereof.

A control rod is disposed within the upper pole portion. A channel engagement projection couples with a lower end of the control rod. The channel engagement projection is received within the at least one inner channel of the second portion of the outer sleeve. A cross pin extends through the first cross pin hole and the second cross pin hole of the upper pole portion. A central portion is disposed within the first alignment notch and the second alignment notch of the interconnecting pole portion. A first end couples with the third cross pin hole of the first portion of the outer sleeve. A second end couples with the fourth cross pin hole of the first portion of the outer sleeve.

A detent pin assembly includes a detent pin disposed within the first detent aperture of the upper pole portion and within the second detent aperture of the upper connecting portion of the interconnecting pole portion, the detent pin extending into the button aperture of the outer sleeve, and a detent spring disposed within the upper connecting portion of the interconnecting pole portion, the detent spring biasing the detent pin within the first and second detent apertures. An outer button is disposed within the button aperture of the outer sleeve. A button spring biases the outer button away from the detent pin. Depressing the outer button dislodges the detent pin from the first detent aperture of the upper pole portion such that the interconnecting pole portion can be disassembled from within the upper pole portion.

In another embodiment, an umbrella pole assembly is provided for supporting a canopy. The umbrella pole assembly includes a lower pole portion and an upper pole portion. The lower pole portion includes an upper end having an upper rim, a first alignment notch in the upper rim, and a second alignment notch in the upper rim. The first alignment notch can be disposed opposite the second alignment notch, e.g., 180 degrees apart from the first alignment notch. Both the first notch and the second notch can be intersected by a plane intersecting the longitudinal axis of the lower pole portion. The upper pole portion can include a lower end that has a cross pin. The upper end of the lower pole portion can be configured to be received within the lower end of the upper pole portion. The cross pin can be configured to be received within the first alignment notch. The cross pin can be configured to also be received within the second alignment notch. The cross pin and notch or notches can be engaged to align the lower pole portion with the upper pole portion in an assembled configuration.

In another embodiment an umbrella pole assembly is provided for supporting a canopy. The umbrella pole assembly includes a lower pole and an upper pole. The lower pole includes an upper end having a first alignment notch that extends from an end of the lower pole. The lower pole optionally also includes a second alignment notch extending from the end of the lower pole. The first alignment notch can be disposed opposite the second alignment notch where the second alignment notch is provided. The upper pole includes a lower end having an alignment feature disposed in an interior thereof and spaced from a lower end of the upper pole. The upper end of the lower pole is configured to be received within the lower end of the upper pole and the alignment feature is configured to be received within the first alignment notch and/or the second alignment notch (where and when provided) to align the lower pole with the upper pole in an assembled configuration.

In some embodiments, the alignment feature is a cross pin. In some embodiments, the lower pole includes an interconnecting pole portion, the interconnecting pole portion including the upper end.

In some embodiments, the umbrella pole assembly further comprises a first detent aperture on the upper end of the lower pole and a second detent aperture on the upper pole. The second detent aperture aligned with the first detent aperture in the assembled configuration.

In some embodiments, the umbrella pole assembly further comprises a detent pin assembly including a detent pin disposed within the first detent aperture of the upper pole and within the second detent aperture of the upper pole of the interconnecting pole portion in the assembled configuration and a detent spring disposed within the lower pole, the detent spring biasing the detent pin within the first detent aperture and the second detent aperture.

In some embodiments, the umbrella pole assembly further comprises an outer sleeve disposed over the lower end of the upper pole. The outer sleeve includes a longitudinal axis and a first portion having a button aperture aligned with the first detent aperture and the second detent aperture in the assembled configuration.

In some embodiments, the cross pin coupled the first portion of the outer sleeve with the upper pole.

In some embodiments, the umbrella pole assembly further comprises an outer button disposed within the button aperture of the outer sleeve and a button spring biasing the outer button away from the detent pin, wherein depressing the outer button dislodges the detent pin from the first detent aperture of the upper pole such that the upper end of the lower pole can be disassembled from within the upper pole.

In some embodiments, the umbrella pole assembly further comprises a second portion of the outer sleeve including an outer grip portion and at least one inner channel, wherein the second portion of the outer sleeve is rotatable about the longitudinal axis relative to the first portion of the outer sleeve.

In some embodiments the umbrella pole assembly further comprises a control rod disposed within the upper pole portion and a projection coupled with a lower end of the control rod. The projection received within the at least one inner channel of the second portion of the outer sleeve.

In some embodiments, the projection extends through an elongate slot on the upper pole portion.

In some embodiments, the cross pin extends through one or more apertures in the outer sleeve.

In some embodiments, the detent spring is a bent elongate resilient wire having a general U-shape.

In some embodiments, the second portion further comprises a lower flange extending circumferentially about the upper pole portion.

In some embodiments, the lower flange extends into a circumferential recess located on the first portion of the outer sleeve.

The foregoing summary is illustrative only and is not intended to be limiting. Other aspects, features, and advantages of the systems and/or other subject matter described in this application will become apparent in the teachings set forth below. The summary is provided to introduce a selection of some of the concepts of this disclosure. The summary is not intended to identify key or essential features of any subject matter described herein

BRIEF DESCRIPTION OF THE DRAWINGS

Various examples are depicted in the accompanying drawings for illustrative purposes, and should in no way be interpreted as limiting the scope of the examples. Various features of different disclosed examples can be combined to form additional examples, which are part of this disclosure.

FIG. 3A shows a section view taken along the line 3A-3A in FIG. 2A.

FIG. 3B shows a section view taken along the line 3B-3B in FIG. 2B.

DETAILED DESCRIPTION

The various features and advantages of the systems of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Multi-Piece Umbrella Pole

Figure 1:
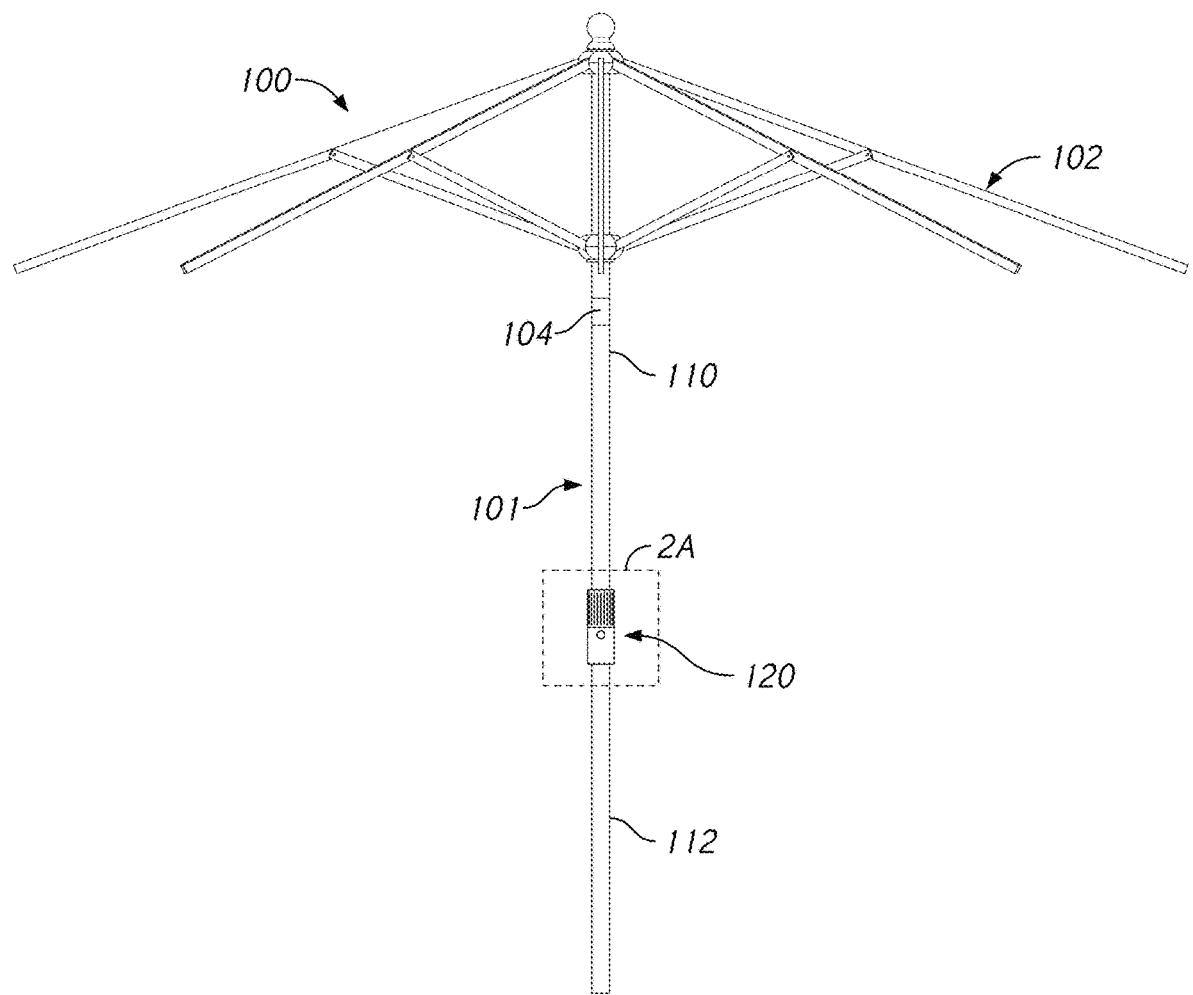
FIG. 1 shows an umbrella assembly including an umbrella pole supporting a canopy portion.
Figure 2A:
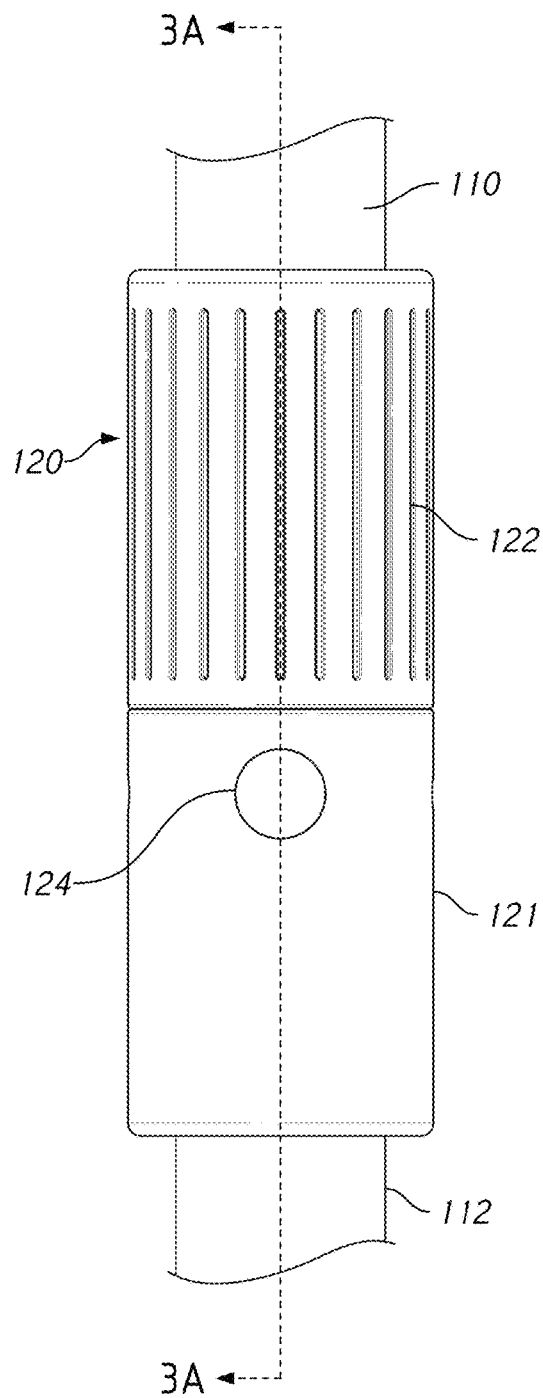
FIG. 2A shows a detailed of an outer sleeve of the umbrella pole shown in FIG. 1.
Figure 2B:
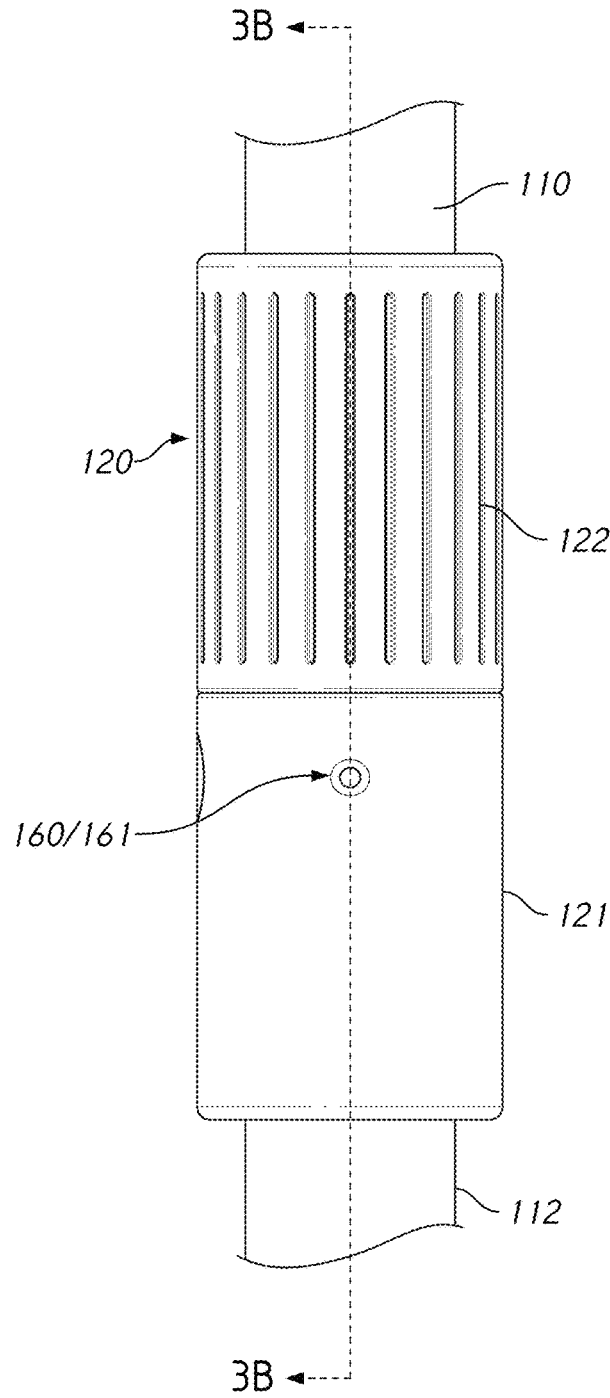
FIG. 2B shows a first-side view of the outer sleeve shown in FIG. 2A.
Figure 4:
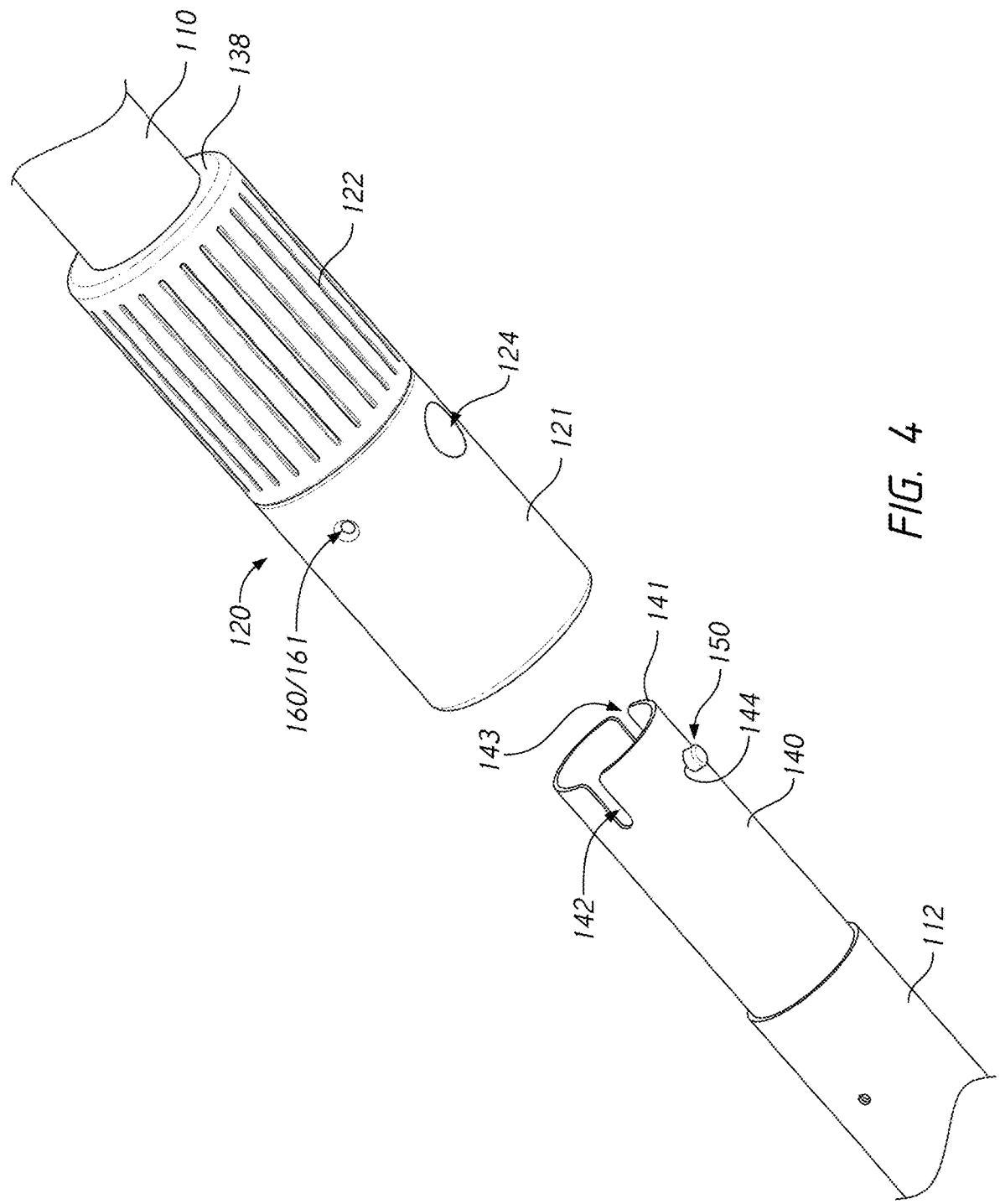
FIG. 4 is an exploded view showing an alignment notch of a first portion of the umbrella pole aligned with a second portion of the umbrella pole.

FIG. 1 shows an umbrella assembly 100 that includes an umbrella pole 101 and a canopy portion 102. The umbrella pole 101 can provide support to the canopy portion 102. The canopy portion 102 can include a plurality of ribs and struts that can move between an open and closed configuration to open and close a canopy (not shown) formed of cloth, plastic, or other light flexible and foldable materials and configurations. The struts and the ribs can be actuatable or moveable between the open and closed configuration by movement of a lower hub and/or upper hub along or relative to the umbrella pole 101. The umbrella pole 101 can be a center pole or a cantilever style pole or other type of umbrella pole. In a cantilever umbrella configuration, the umbrella pole 101 can be supported vertically and can be coupled to a canopy portion 102 by a transverse pole (not shown) that can extend between the pole 101 and the canopy portion 102. The pole assemblies disclosed herein can be provided in other supports of an umbrella as well, e.g., in a transverse support of a cantilever umbrella. The canopy portion 102 can also be realigned or tilted with respect to the umbrella pole 101 via a tilt mechanism 104. Such a tilt mechanism can be found in U.S. Pat. No. 10,758,015, the entirety of which is hereby incorporated by reference.

The elongate umbrella pole 101 can include two or more disassembled pieces, e.g., in a shipping configuration. These pieces can then be assembled by a user (e.g., after shipping or storage in a smaller container). Accordingly, one aspect of the present disclosure is a realization of the difficulty in assembling a multi-piece umbrella pole and related improvements. This can be particularly true in large umbrellas where even pole sections can be heavy. Also, when locking devices are largely inside the pole rotational alignment of pole portions can be challenging, frustrating the user.

The umbrella pole 101 can include an upper portion 110 and a lower portion 112. The upper portion 110 can be assembled or disposed between the lower portion 112 and the tilt mechanism 104 or the canopy portion 102 when the umbrella is assembled. The upper portion 110 can be an assembly including a hollow pole and the tilt mechanism 104. The upper portion 110 can extend to and be coupled with an upper hub of the umbrella 100. The lower portion 112 can include a lower end that interfaces with a base or other support structure (not shown). Although the umbrella pole 101 is shown including only two pieces additional sections of the umbrella pole 101 can alternatively be employed.

The upper pole portion 110 can be connected with the lower pole portion 112 at an outer sleeve 120. The outer sleeve 120 can be located approximately halfway between the tilt mechanism 104 and a lower end of the lower pole portion 112. The outer sleeve 120 can include mechanisms (or portions thereof) for attaching and/or detaching the lower pole portion 112 with the upper pole portion 110. The outer sleeve 120 can also provide an actuator mechanism for tilting the canopy portion 102 using the tilt mechanism 104. In one embodiment, the outer sleeve 120 is assembled to a hollow pole of the upper pole portion 110. FIGS. 2A-3B show further detail of the connection between the lower pole portion 112 and the upper pole portion 110.

The lower pole portion 112 can comprise a hollow pole or pipe segment having an outer cylindrical wall, though other shapes are possible. The hollow pole or pipe segment be formed as an extrusion of aluminum or by another process or using another material. The outer cylindrical wall of the hollow pole or pipe segment can extend along the longitudinal axis of the umbrella pole 101. The outer cylindrical wall can include or can enclose an interior space therein. The outer cylindrical wall can include a lower end and an upper end. The lower pole portion 112 can be generally cylindrical in shape, although this is not required. The upper pole portion 110 can comprise a hollow pole or pipe segment having an outer wall. The outer wall can be cylindrical in shape and extend about the longitudinal axis of the umbrella pole 101. The upper portion 112 can include or can enclose an interior space therein extending between a lower end and an upper end of the upper portion 110.

The upper pole portion 110 can have a diameter matching a diameter of the lower pole portion 112. The upper pole portion 110 can interface with the lower pole portion 112 at an interface 111. At the interface 111, an outer rim of the lower end of the upper pole portion 110 can contact an outer rim of an upper portion of the lower pole portion 112. This can be within or without the outer sleeve 120.

The upper pole portion 110 can include or enclose a control rod 106. The control rod 106 can be disposed within the interior space of the upper pole portion 110. The control rod 106 can be coupled with the tilt mechanism 104. The control rod 106 can move axially along the longitudinal axis of the umbrella pole 101 to actuate the tilt mechanism 104. A lower end of the control rod 106 can include a slide block 107. The slide block 107 can include one or more channel engagement projections extending outwardly therefrom. The channel engagement projections can include a first projection 108 and a second projection 109. The first channel engagement projection 108 can extended in an opposite direction from the second channel engagement projection 109 relative to the control rod/slide block. The upper pole portion 110 can include a plurality of slots corresponding to or aligned with the plurality of channel engagement projections. The slots 115 can be generally elongate and extend along an axis parallel to the control rod 106. The first projection 108 can include an inner end that is recessed within the control rod 106 or within the block 107. An outer end of the projection 108 can engage within one or more helical threads, e.g., helical channel 132 of the second portion 122 of the outer sleeve 120. The outer end can include a truncated conical shape. The projection 108 can extend through a slot 114 from the interior portion of the upper pole portion 110 into engagement with the one or more channels 132. Similarly, the projection 109 can extend through a second slot 115 and engage within the one or more channels 132. Rotation of the second portion 122 of the outer sleeve 120 about the longitudinal axis can translate into axial (e.g., up and down movement) of the channel engagement projections 108, 109. Rotation of the second portion 122 of the outer sleeve 120 about the longitudinal axis can translate into axial (e.g., up and down movement) of the block 107. Rotation of the second portion 122 of the outer sleeve 120 about the longitudinal axis can translate into axial (e.g., up and down movement) of the control rod 106. This can be used to actuate the tilt mechanism 104 between tilted and untilted configurations.

The upper pole portion 110 can include a detent aperture 118. The detent aperture 118 can be space from the lower end of the upper pole portion 110. The detent aperture 118 can be recessed within the outer sleeve 120 in the assembled configuration.

The upper pole portion 110 can include an alignment feature, which can be a cross pin 160. The cross pin 160 can extend across the interior portion of the upper pole portion 110. The cross pin 160 extending there through transversely to the longitudinal axis of the umbrella pole 101. The cross pin 160 can extend across an interior space within the upper pole portion 110. The cross pin 160 can couple with the outer wall of the upper pole portion 110. The cross pin 160 can be recessed away from the lower end of the upper pole portion 110. The cross pin 160 can be located within the outer sleeve 120. The cross pin 160 can extend through one or more apertures in the outer sleeve 120, such as cross pin holes 161, 162 located in a first portion of the outer sleeve 120.

The lower pole portion 112 can be coupled with or include an interconnecting pole portion 140. The lower pole portion 112 can include a cross pin, adhesive, or other mechanical connection to couple with the interconnecting pole portion 140. The interconnecting pole portion 140 can have a diameter that is smaller than an inner diameter of the upper or lower pole portions 110, 112. A lower connecting portion of the interconnecting pole portion 140 can be disposed within the upper end of the lower pole portion 112 and an upper connection portion of the interconnecting pole portion 140 extend outwardly therefrom. The interconnecting pole portion 140 can include a pipe segment having an outer wall. The outer wall can be recessed within the outer wall of the lower pole portion 112. The interconnecting pole portion 140 can be assembled with, e.g., permanently affixed to, the lower pole portion 112 and can be removably inserted within the lower end of the upper pole portion 110 in the assembled configuration. The interconnecting pole portion 140 can be configured to provide alignment between the upper and lower pole portions 110, 112.

The lower pole portion 112 e.g., the interconnecting pole portion 140 where provided, can include an upper rim 141. The upper rim 114 can extend about a circumference of the upper end of the interconnecting pole portion 140. The upper rim 141 of the interconnecting pole portion 140 can include one or more, e.g., a plurality of alignment notches. A first alignment notch 142 can be disposed on an opposite side of the rim 141 from a second alignment notch 143. The alignment notches 142, 143 can be generally U-shaped portions that extend from an upper edge of the rim 141 along the longitudinal axis of the umbrella pole 101 to a closed end. The alignment notches 142, 143 can be larger e.g., five percent larger, ten percent larger, twenty percent larger, thirty percent larger, forty percent larger, fifty percent larger, one hundred percent larger, or larger within any range including any of the foregoing end points, than the cross pin 160. In the assembled configuration, the cross pin 160 can be received within the alignment notches 142, 143. The engagement of the cross pin 160 with the alignment notches 142, 143 can streamline assembly of the umbrella pole 101. Because of the recessed nature of the cross pin, the alignment notch or notches 142, 143 aid a user to align the pole sections 110, 112 by feel (e.g., without seeing the cross pin 160).

The interconnecting pole portion 140 or top portion of the lower pole portion 112 can include a detent aperture 144. The detent aperture 144 can be spaced from the rim 141 of the interconnecting pole portion 140. The detent aperture 144 can be recessed or disposed within or inserted into the outer sleeve 120 in the assembled configuration.

The interconnecting pole portion 140 can include a detent pin assembly 150. The detent pin assembly 150 can include a detent pin 151 disposed within the detent aperture 144 of the interconnecting pole portion 140. The detent pin 151 can include a first end having a first diameter and a second end having a second diameter larger than the first diameter. The second diameter can be larger than a diameter, dimension or size than the detent aperture 144. The first diameter can be smaller than a diameter, dimension or size of the detent apertures 144 and 118. In the assembled configuration, the detent aperture 144 can be aligned with the corresponding detent aperture 118 in the upper pole portion 110. The detent pin 151 can be disposed through both the detent apertures 144, 118 to fix the interconnecting pole portion 140 with the upper pole portion 110 in the assembled configuration.

The detent pin assembly 150 can further include a detent spring 152. The detent spring 152 can comprise a bent elongate resilient wire. The elongate wire can be bent in a general U-shape, having one end received within an aperture in the second end of the detent pin 151. The detent spring can otherwise be a conventional coil spring or other spring member. The detent spring 152 can bias the detent pin 151 within the detent aperture 144. The second end of the detent pin 151 can be located within the interior space of the interconnecting pole portion 140.

Another benefit of the engagement of the alignment notches 142, 143 with the cross pin 160 is that the engagement can align the detent pin 151 and the detent aperture 118 with the detent aperture 144. Because of the alignment notches 142, 143 and the cross pin 160, a user need not be able to see the detent aperture 144 to align it with the detent pin 151. The detent pin 151 can be inserted within the detent aperture 144 in the assembled configuration to secure the two pole sections together. Inserting the detent pin 151 into the detent aperture 144 can including depressing the detent pin 151 to allow the upper pole portion 110 to slide into position with the detent apertures 144/118 aligned. This can be facilitated by the button assembly described below.

Outer Sleeve

The outer sleeve 120 can include an outer surface disposed around an outer periphery of the umbrella pole 101. The outer sleeve 120 can be generally cylindrical in shape, although this is not required. The outer sleeve 120 can have an outer portion that extends between an upper end and a lower end of the outer sleeve 120. The outer sleeve 120 can extend along the longitudinal axis of the umbrella pole 101. The lower end of outer sleeve 120 can be aligned with the interface 111 between the upper and lower pole portions 110, 112.

The outer sleeve 120 can include a first portion 121 and a second portion 122. The first portion 121 can be fixed relative to the upper pole portion 110. The cross pin 160 can extend into the cross pin holes 161, 162 within the first portion 121. The cross pin 160 can be fixed within the first portion 121 by mechanical mean such as rivets, screws or the like.

The first portion 121 can include a button assembly 124. The button assembly 124 can include a recess within the first portion 121. The recess can be aligned with the detent aperture 144 of the upper pole portion 110. In the assembled configuration, the detent pin 151 can be received at least partially within the recess. The button assembly 124 can include an outer button 125. The outer button 125 can be at least partially disposed within the recess. The outer button 125 can be received within the recess and held in place there by one or more outer flanges on the first portion 121 that engage corresponding flange portions of the outer button 125.

The button assembly 124 can include a spring 126. The spring 126 can be a helical spring or other spring member. The spring 126 can bias the outer button 125 away from a central axis of the umbrella pole 101 while remaining in contact with the detent pin 151. The outer button 125 can include an inner projection 125a having an inner surface coupled with or in contact with an outer surface of the detent pin 151. The outer button 125 can be aligned with the detent pin 151 in the assemble configuration such that depression of the outer button 125 causes the inner projection 125a to depress the detent pin in the direction of being removed from the aperture 118 and/or the aperture 144. This can facilitate assembly or disassembly of the upper pole portion 110 relative to the interconnecting pole portion 140. The detent spring 152 can prevent the detent pin 151 from being fully removed from the detent aperture 144 or lost within the interconnecting pole 140 or the lower portion 112.

The second pole portion 122 can be rotatable with respect to the upper pole portion 110 and/or the first portion 121. The second portion 122 can be rotatable about a longitudinal axis of the umbrella pole 101. The second portion 122 can include an outer grip portion having texture or grip features thereon. The second portion 122 can include the outer wall. An inner side of the outer wall can include the one or more helical channels, e.g., channels 132. The channels 132 can be helical channels that extend between an upper end and a lower end of the second portion 122 (e.g., from an upper end and a lower end of the second portion 122). Rotation of the second pole portion 122 can move the control rod 106, projections 108, 109, and block 107 in the axial direction.

The second portion 122 can include a lower flange 134. The lower flange 134 can extend circumferentially about the upper pole portion 110. The lower flange 134 could be oriented generally orthogonally with respect to the longitudinal axis of the umbrella pole 101. The first portion 121 can include a circumferential recess 123. The circumferential recess 123 can be located on an upper end of the first portion 121. The lower flange 134 can be received within the circumferential recess 123. The lower flange 134 can be disposed below a circumferential channel 135 in the outer surface of the second portion 122. The first portion 121 can have a circumferential projection 136 disposed above the recess 123. The channel 135 can receive the projection 136 to rotatably couple the second portion 122 to the first portion 121. This connection configuration can have the effect of making the second portion 122 rotatable with respect to the first portion 121 and it can fix the axial position of the second portion 122 relative to the first portion 121 about the upper pole portion 110.

An upper end of the outer sleeve 120 can include a cap 138. The cap 138 can be disposed circumferentially about the upper pole portion 110. The cap 138 can include one or more threads and engage with corresponding threads within an upper end of the second portion 122 of the outer sleeve 120. An inner diameter of the cap 138 can fit closely with an outer surface of the upper pole portion 110.

Certain Terminology

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" can refer to something that departs from exactly parallel by less than or equal to 20 degrees. All ranges are inclusive of endpoints.

SUMMARY

Several illustrative examples of umbrella poles have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the examples.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices may be configured differently than illustrated in the figures or description herein. For example, various functionalities provided by the illustrated modules can be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification can be included in any example.

In summary, various examples of umbrella poles have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples can be combined with, or substituted for, one another. Accordingly, the scope of this disclosure should not be limited by the particular disclosed examples described above, but should be determined only by a fair reading of the claims.

What is claimed is:

1. An umbrella pole assembly for supporting a canopy comprising:
   a lower pole portion including:
      an upper end having an upper rim;
      a first alignment notch in the upper rim; and
      a second alignment notch in the upper rim, the first alignment notch disposed opposite the second alignment notch;
   an upper pole portion including a lower end having a cross pin; and
   an outer sleeve disposed over the lower end of the upper pole portion;
   wherein the upper end of the lower pole portion is configured to be received within the lower end of the upper pole portion, and the cross pin is configured to be received within the first alignment notch and the second alignment notch to align the lower pole portion with the upper pole portion in an assembled configuration.

2. The umbrella pole assembly of claim 1, wherein the upper pole portion includes:
   a first cross pin hole; and
   a second cross pin hole disposed opposite the first cross pin hole;
   the cross pin coupled with the first cross pin hole and the second cross pin hole.

3. The umbrella pole assembly of claim 1, wherein the lower pole portion includes an interconnecting pole portion, the interconnecting pole portion including the upper end having the upper rim.

4. The umbrella pole assembly of claim 3, further comprising:
   a first detent aperture on the upper end of the lower pole portion; and
   a second detent aperture on the upper pole portion, the second detent aperture configured to be aligned with the first detent aperture in the assembled configuration.

5. The umbrella pole assembly of claim 4, further comprising:
   a detent pin assembly including:
      a detent pin disposed within the first detent aperture on the upper end of the lower pole portion and within the second detent aperture on the upper pole portion in the assembled configuration.

6. The umbrella pole assembly of claim 5, further comprising:
   a detent spring disposed within the lower pole portion, the detent spring biasing the detent pin within the first detent aperture and the second detent aperture.

7. The umbrella pole assembly of claim 6, wherein the outer sleeve comprises:
   a longitudinal axis; and
   a first portion having a button aperture aligned with the first detent aperture and the second detent aperture in the assembled configuration.

8. The umbrella pole assembly of claim 7, wherein the cross pin couples the first portion of the outer sleeve with the upper pole portion.

9. The umbrella pole assembly of claim 8, further comprising:
   an outer button disposed within the button aperture of the outer sleeve; and
   a button spring biasing the outer button away from the detent pin;
   wherein depressing the outer button dislodges the detent pin from the first detent aperture of the upper pole portion such that the upper end of the lower pole portion can be disassembled from within the upper pole portion.

10. The umbrella pole assembly of claim 8, further comprising:
    a second portion of the outer sleeve, including:
       an outer grip portion; and
       at least one inner channel;
       wherein the second portion of the outer sleeve is rotatable about the longitudinal axis relative to the first portion of the outer sleeve.

11. The umbrella pole assembly of claim 10, further comprising:
    a control rod disposed within the upper pole portion; and
    a projection coupled with a lower end of the control rod, the projection received within the at least one inner channel of the second portion of the outer sleeve.

12. The umbrella pole assembly of claim 11, wherein the projection extends through an elongate slot on the upper pole portion.

13. An umbrella pole assembly for supporting a canopy comprising:
    a lower pole including an upper end having a first alignment notch extending from an end of the lower pole and a second alignment notch extending from the end of the lower pole, the first alignment notch disposed opposite the second alignment notch;
    an upper pole including a lower end having an alignment feature disposed in an interior thereof and spaced from a lower end of the upper pole; and an outer sleeve disposed over the lower end of the upper pole;

wherein the upper end of the lower pole is configured to be received within the lower end of the upper pole and the alignment feature is configured to be received within one or both of the first alignment notch and the second alignment notch to align the lower pole with the upper pole in an assembled configuration.

14. The umbrella pole assembly of claim 13, wherein the alignment feature is a cross pin.

15. The umbrella pole assembly of claim 14, wherein the lower pole includes an interconnecting pole portion, the interconnecting pole portion including the upper end.

16. The umbrella pole assembly of claim 15, further comprising:
   a first detent aperture on the upper end of the lower pole; and
   a second detent aperture on the upper pole, the second detent aperture aligned with the first detent aperture in the assembled configuration.

17. The umbrella pole assembly of claim 16, further comprising:
   a detent pin assembly including:
      a detent pin disposed within the first detent aperture on the upper end of the lower pole and within the second detent aperture on the upper pole of in the assembled configuration; and
      a detent spring disposed within the lower pole, the detent spring biasing the detent pin within the first detent aperture and the second detent aperture.

18. The umbrella pole assembly of claim 17, the outer sleeve comprising:
   a longitudinal axis; and
   a first portion having a button aperture aligned with the first detent aperture and the second detent aperture in the assembled configuration.

19. The umbrella pole assembly of claim 18, wherein the cross pin couples the first portion of the outer sleeve with the upper pole.

20. The umbrella pole assembly of claim 19, further comprising:
   an outer button disposed within the button aperture of the outer sleeve; and
   a button spring biasing the outer button away from the detent pin;
   wherein depressing the outer button dislodges the detent pin from the first detent aperture of the upper pole such that the upper end of the lower pole can be disassembled from within the upper pole.

* * * * *

UNITED STATES PATENT AND TRADEMARK OFFICE
CERTIFICATE OF CORRECTION

| | | |
|---|---|---|
| PATENT NO. | : 12,207,714 B2 | Page 1 of 1 |
| APPLICATION NO. | : 17/815869 | |
| DATED | : January 28, 2025 | |
| INVENTOR(S) | : Zhun-An Ma | |

It is certified that error appears in the above-identified patent and that said Letters Patent is hereby corrected as shown below:

On the Title Page

Page 4, Column 2 item (56) (Foreign Patent Documents), Line 2, delete "EP 007772157-0001" and insert -- EM 007772157-0001 --.

In the Specification

Column 9, Line 66, delete "and "substantially." may" and insert -- and "substantially," may --.

In the Claims

Column 13, Claim 17, Line 25, delete "pole of in" and insert -- pole in --.

Signed and Sealed this
Nineteenth Day of August, 2025

Coke Morgan Stewart
*Acting Director of the United States Patent and Trademark Office*